P. J. E. PROUD.
REAR AXLE DRIVE.
APPLICATION FILED JUNE 8, 1915.
1,149,985.
Patented Aug. 10, 1915.
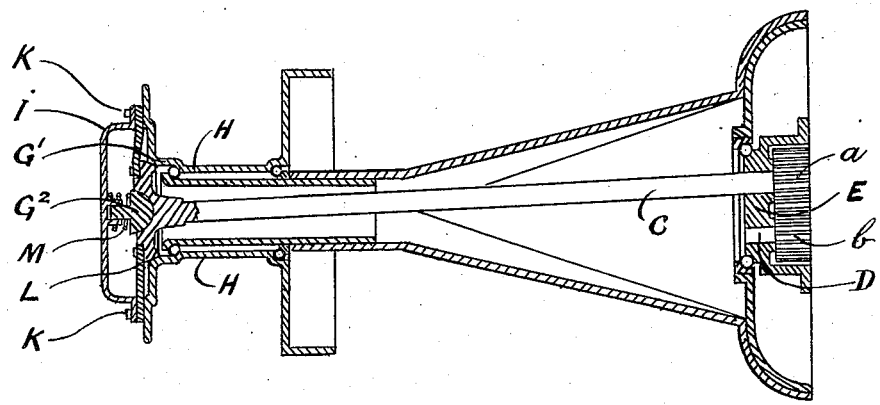

UNITED STATES PATENT OFFICE.

PERCY JAMES ERNEST PROUD, OF DUBLIN, IRELAND.

REAR-AXLE DRIVE.

1,149,985.  Specification of Letters Patent.  Patented Aug. 10, 1915.

Application filed June 8, 1915. Serial No. 32,984.

*To all whom it may concern:*

Be it known that I, PERCY JAMES ERNEST PROUD, of 77 Pembroke road, Dublin, Ireland, have invented an Improved Rear-Axle Drive for Motor Road-Vehicles, of which the following is a specification.

This invention relates to an improved method of rear axle drive and transmission.

In the figure is shown one half of the complete axle which consists of a differential composed of two parallel toothed gear wheels $a$ and $b$ contained in a differential casing E, which revolves on ball bearings inside the axle casing. Into these parallel toothed gear wheels fit splined axles C and D, the differential casing being made elliptical in order to facilitate their replacements or withdrawals. The outer ends of these axles are composed of ball socket joints placed inside of the driving hubs H, which revolve on the axle casing. The ball socket joints are composed of outer and inner concentric spherical bearing surfaces on which and into which fit liked shaped bearing surfaces $G^1$ and $G^2$ being part of and attached to the wheel hub H. In order to transmit the drive from the axles to the wheel hubs a circular disk of flexible material L preferably leather has its inner circumference bolted to the portion of the ball socket joint attached to the axle, and at right angles thereto and in such a way that its center is coincident with the center of the outer and inner ball socket bearing surfaces, the outer circumference of the disk being secured between the hub H and the covering plate I, by means of bolts K. This plate carries the internal member $G^2$ of the ball socket joint and a strong spring M or a screw method of adjustment may be used.

Having now particularly described and ascertained the nature of my invention and in what manner the same is to be performed I declare that what I claim is—

In a differential, a pair of gears, a pair of axles for the said gears, said axles having at their outer ends ball and socket joints, a driving hub inclosing said ball and socket joints, said joints having outer and inner concentric spherical bearing surfaces, and bearing surfaces on said hub adapted to receive the said former bearing surfaces.

PERCY JAMES ERNEST PROUD.

Witnesses:
 RIPLEY WILSON,
 O. J. WORTH.

Copies of this patent may be obtained for five cents each, by addressing the "Commissioner of Patents, Washington, D. C."